July 9, 1946.  D. S. HERSEY  2,403,797
ENGINE COWLING
Filed May 31, 1940
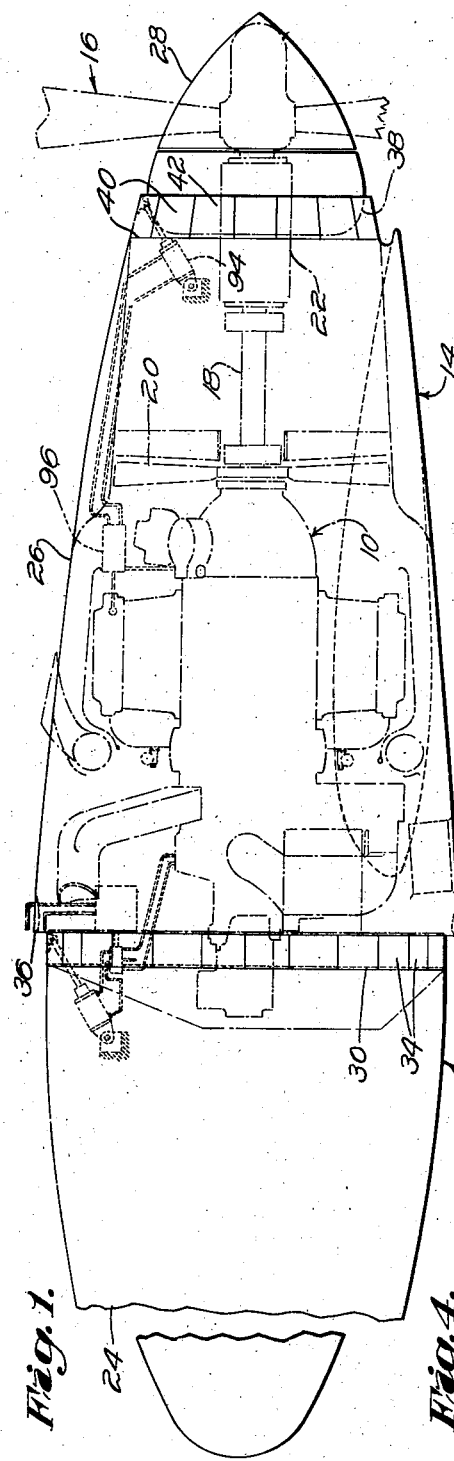
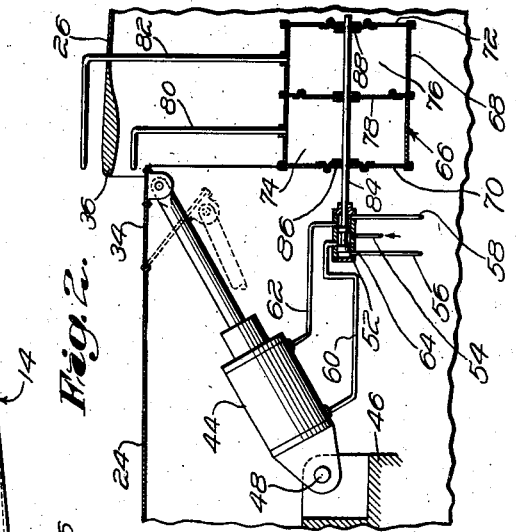
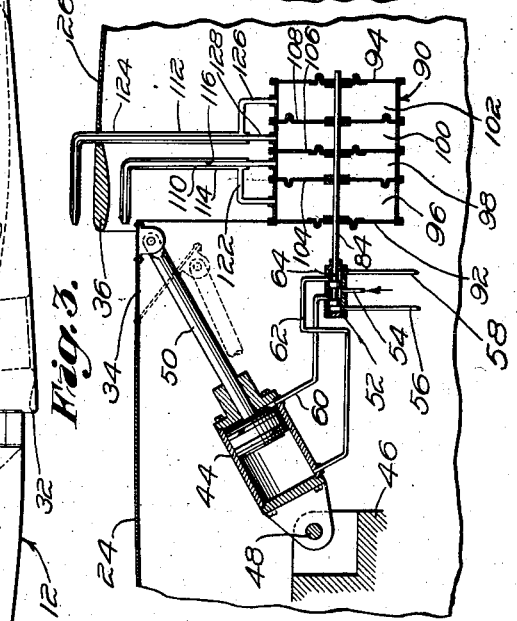
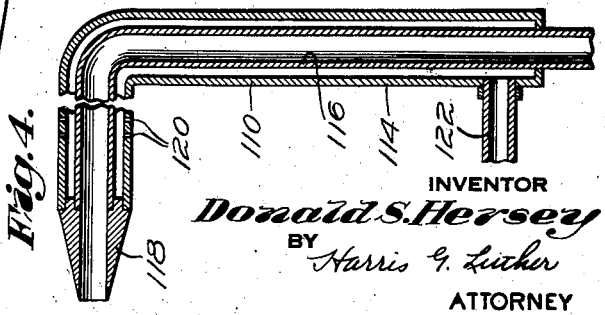
INVENTOR
Donald S. Hersey
BY Harris G. Luther
ATTORNEY Patented July 9, 1946

2,403,797

UNITED STATES PATENT OFFICE 2,403,797

ENGINE COWLING

Donald S. Hersey, West Hartford, Conn., assignor to United Aircraft Corporation, East Hartford, Conn., a corporation of Delaware Application May 31, 1940, Serial No. 337,955

10 Claims. (Cl. 123—171)

This invention relates to improvements in means for controlling the supply of cooling air to an enclosed vehicle engine and relates particularly to improved cooling air control means for a cowl enclosed aircraft engine.

An object of the invention resides in the provision of an improved cooling air control means which will maintain at all times an adequate supply of cooling air to prevent overheating of the engine and will at the same time maintain the engine nacelle at the minimum drag condition consistent with an adequate supply of cooling air.

A somewhat more specific object resides in the provision in combination with an aircraft engine cowling having a cooling air entrance opening and means for controlling the opening, of means for maintaining the entrance opening at the minimum consistent with an adequate supply of engine cooling air at various aircraft speeds.

Other objects and advantages will be more particularly pointed out hereinafter or will become apparent as the description proceeds.

In the accompanying drawing, in which like reference numerals are used to designate similar parts throughout, there is illustrated a suitable mechanical embodiment for the purpose of disclosing the invention. The drawing, however, is for the purpose of illustration only and is not to be taken as limiting or restricting the invention since it will be apparent to those skilled in the art that various changes in the illustrated construction may be resorted to without in any way exceeding the scope of the invention.

In the drawing,

Fig. 1 is an elevational view of an aircraft engine nacelle having means for controlling the flow of engine cooling air through the engine enclosing portion thereof, the improved means for actuating the airflow control means being shown in dotted lines on this figure.

Fig. 2 is a sectional view on an enlarged scale of a portion of the improved airflow control means.

Fig. 3 is a view similar to Fig. 2 showing a somewhat modified form of airflow control means, and Fig. 4 is a sectional view on an enlarged scale of the Pitot-static tubes for the control means shown in Fig. 3.

Referring to the drawing in detail, the numeral 10 generally indicates an aircraft engine which may be an air-cooled radial type of engine such as is conventionally employed for the propulsion of aircraft. This engine is mounted in a nacelle, generally indicated at 12, which is shown as mounted on an aircraft wing, generally indicated at 14. The engine has a number of cylinders provided with heat radiating surfaces in the form of cooling fins. The invention is not limited to any particular type of engine, however, and could be applied with equal facility to a liquid cooled engine having a heat dissipating radiator.

In the arrangement illustrated, the powerplant is of the pusher type and includes an engine driven propeller, generally indicated at 16, mounted at the rear end of the nacelle 12 somewhat to the rear of the trailing edge of the wing 14, and connected to the engine by an extension shaft 18 which may carry a cooling air fan 20 and a vibration reducing resilient torque cushion and supporting bearing 22 of some conventional or desired construction.

The nacelle 12 has three main portions, namely, a smooth streamlined front end or nose portion 24 projecting forwardly beyond the leading edge of the wing 14, an intermediate engine enclosing portion 26, and a rear streamlined portion 28 in the form of a spinner mounted around the hub of the propeller 16.

The rear edge of the forward portion, as indicated at 30, is spaced somewhat ahead of the leading edge 32 of the intermediate portion 26 and a series of interconnected flap members 34 are pivotally connected to the edge 30 and arranged to span the gap between the edges 30 and 32. The forward end of the member 26 is preferably somewhat larger than the rearward end of the forward section 24 in order to provide an annular air entrance slot at the forward end of the member 26 which slot is controlled by the flaps 34. If desired the forward end of the member 26 may be provided with a rounded or streamlined bead 36 to facilitate the entrance of engine cooling air into the forward end of the intermediate portion 26.

The forward end of the rear spinner member 28 may be rounded, as indicated at 38, and spaced from the rearward edge 40 of the intermediate portion 26 and the gap between the edge 40 and the member 28 may be spanned by a plurality of interconnected movable flaps 42 hinged to the edge 40.

With this arrangement the cooling air will enter the forward end of the intermediate portion 26 through the annular space between the edge 32 and the flaps 34 and will flow rearwardly past the engine 10 and through the fan 20 and out through the space between the flaps 42 and the forward portion of the member 28, the fan facilitating the flow of cooling air through the engine enclosure, particularly at low aircraft speeds as during take-off or when the aircraft is taxiing on the ground and acting at all times to overcome the resistance to the flow of cooling air through the engine enclosure so that the net resistance to airflow through the enclosure is about the same as the resistance to airflow along the outside of the enclosure.

The position of the flaps 34 is controlled by a suitable power actuated device, such, for example, as the fluid motor 44, the cylinder of which is pivotally connected to a fixed member 46 by the pivots 48 and the piston rod 50 of which is pivotally connected to one of the flaps 34 the interconnection between the flaps being such that when one flap is moved all of the flaps will move simultaneously. The supply of fluid under pressure to the opposite ends of the motor 44 is controlled by a servo valve, generally indicated at 52, which has a pressure fluid connection 54 and two drain connections 56 and 58 and two connections 60 and 62 with the respective ends of the motor 44. This valve includes a plunger 64 actuated by an air pressure differential responsive device, such as generally indicated at 66 in Fig. 2, to connect one end or the other, of the motor 44 with the pressure line 54 and simultaneously connect the opposite end of the motor with the respective drain channel 56 or 58. The air pressure differential responsive device 66 comprises a container 68 closed by end walls 70 and 72 and divided into two substantially equal chambers 74 and 76 by the flexible transverse partition 78. A Pitot tube 80, having its open end disposed in the slot between the adjacent edges of the members 24 and 26, leads into the chamber 74 and a similar tube 82, having its open end directed into the airflow along the outside of the member 26, leads into the chamber 76, any pressure differential incident to a difference in velocity of airflow through the cooling air entrance slot and along the outside of the engine cowl will be transmitted by the Pitot tubes 80 and 82 to the respective chambers 74 and 76 and will act on the diaphragm 78 to move the diaphragm in one direction or the other. A link 84 is connected to the diaphragm 78 and to the valve plunger 64 to transmit movements of the diaphragm to the valve plunger and is sealed to the end walls 70 and 72 by means of the balancing diaphragms 86 and 88.

With this arrangement, any difference in airflow speed through the entrance gap and along the outside of the cowl will cause an adjustment of the flaps 34 to change the area of the gap until the two airflow speeds are substantially equalized.

The arrangement shown in Fig. 3 is substantially the same in principle as that illustrated in Fig. 2 and described above but is arranged for greater accuracy of control. In this arrangement, the space within the pressure differential responsive device, generally indicated at 90, between the end walls 92 and 94, is divided into four chambers 96, 98, 100 and 102 by the three transverse diaphragms 104, 106, and 108. The actuating link 84 for the valve plunger 64 extends through the three diaphragms and the two end walls 92 and 94 and the rigid center partition 106 by flexible seals and is rigidly connected to the two flexible working diaphragms 104 and 108. A Pitot-static tube 110 has its open end directed into the airflow through the air entrance gap and is connected with the chambers 96 and 98, and a second Pitot static tube 112 has its open end directed into the airflow along the outside of the cowl 26 and is connected with the chambers 100 and 102.

The arrangement of the Pitot static tubes is particularly illustrated in Fig. 4 and, as the construction of both tubes is the same, it will be assumed that the tube thus illustrated in detail is the tube 110. This arrangement comprises an outer tube 114 and a concentric inner tube 116 somewhat smaller than the tube 114. The inner tube projects into an inlet nozzle 118 having an aperture therethrough of substantially the same size as the bore of the inner tube and constituting an inlet therefor, while the end of the outer tube is sealed against the base of the nozzle and the wall of this tube is provided with one or more apertures, as indicated at 120, for connecting the interior of the tube with the atmosphere surrounding the nozzle end of the tube. The tube 114 terminates somewhat short of the tube 116 and a conduit 122 connects the interior of this outer tube with the chamber 96 while the inner tube 116 is continued to a connection with the interior of the chamber 98. Similarly the outer or static pressure tube 124 of the Pitot static tube 112, is connected through the conduit 126 with the chamber 102 while the inner or velocity tube 128 is connected with the chamber 100. Pressures created by airflow velocities through the air entrance gap and along the exterior of the cowl transmitted through the inner tubes 116 and 128 to the respective chambers 98 and 100 act on the flexible diaphragms 104 and 108 in opposite directions so that a difference in velocity of the two air streams will produce a resultant force on the link 84 tending to move the valve plunger 64 to reposition the flaps 34 to equalize the velocities. At the same time the static pressures of the two air streams will be transmitted through the outer tubes 114 and 124 to the respective chambers 96 and 102 and will also act on the diaphragms 104 and 108 in opposite directions. The static pressures will produce forces on the respective diaphragms acting in opposition to the forces produced by the pressures in the chambers 98 and 100. As the pressures produced in the chambers 98 and 100 are the result of both static pressure and airflow velocity at the inlet ends of the respective inner tubes 116 and 128, the subtraction from these forces of the forces due to the static pressure alone gives a resultant that is accurately proportioned to the difference in air flow velocities through the air entrance gap and along the exterior of the cowl.

As the errors due to differences in static pressure are extremely small, the device shown in Fig. 2 would give satisfactory practical results and has the advantage of greater simplicity. The device of Fig. 3, however, will give an extremely sensitive and accurate control where great accuracy is required.

Since a minimum drag condition exists when the velocity of the air flowing into the member 26 is substantially equal to the velocity of the air flowing along the outside of the member, either of the above arrangements will tend to maintain at all times a minimum drag condition for the airplane, and will automatically adjust the position of the flaps 34 in accordance with conditions of airplane speed and cooling air requirements. As the air flowing through the engine enclosure 26 is moved by the fan 20, as far as the flap control is concerned, the air will move through the cowl without appreciable resistance and the velocity at the cooling air inlet may be maintained equal to the exterior airflow by proper adjustment of the flaps 34.

The fan 20 may be assisted by a set of adjustable rear flaps at the cowl outlet opening. A second motor 94, which may be a fluid motor similar to the motor 44, may be operatively connected with the rear flaps 42 and may be controlled by a servo-mechanism 94 responsive to some engine operating condition, such as the temperature of the engine cylinder heads. This device would operate the flaps 42 to control the air exit opening in accordance with the specified engine operating conditions. Thus, in the arrangement illustrated, if the engine cylinder head temperature should become too high, the motor 94 would act to open the flaps 42, reduce the resistance to the airflow through the engine enclosure. This would result in an increase in the airflow velocity past the tube 80 and create a pressure differential which would actuate the motor 44 to move the flaps 34 to increase the air entrance opening to the engine enclosure 26. With a given air exit opening area, as the inlet opening area increased the velocity of flow through the inlet opening would decrease and a balanced condition between the velocities of flow along the outside of the engine enclosure and into the engine enclosure would be reestablished with an increased flow of cooling air, and the minimum drag condition would be maintained with an adequate supply of cooling air to maintain the engine temperatures at normal operating values. If the cooling air requirements decreased a proportionate closing of the flaps 34 would also equalize the air flow velocities through the inlet gap and along the exterior of the cowl.

While a particular mechanical arrangement has been hereinabove described and illustrated in the accompanying drawing for the purpose of disclosing the invention, it is to be understood that the invention is not limited to the particular arrangement so described and illustrated, but that such changes in the size, shape and arrangements of the various parts may be resorted to as come within the scope of the subjoined claims.

Having now described the invention so that others skilled in the art may clearly understand the same, what it is desired to secure by Letters Patent is as follows:

1. In combination, a streamlined enclosure surrounding a heat radiator and having an air entrance opening and an air exit opening, means for maintaining the drag of said enclosure at a minimum and regulating the quantity of air flowing past said heat radiating surfaces comprising, adjustable means at said air entrance opening for varying the area thereof, adjustable means at said air exit opening for varying the area thereof, means responsive to the difference in velocity of the air flowing along the outside of said enclosure near said air entrance opening and the air flowing through said air entrance opening operatively associated with said entrance opening varying means to maintain said velocity difference below a predetermined value, and a device controlled by an operating condition of the heat radiator and operatively associated with said exit opening varying means to limit the quantity of air passing through said enclosure to the cooling requirements of said heat radiating surfaces.

2. In engine cooling means including an open ended enclosure surrounding the engine heat radiating surfaces, and adjustable means operatively associated with said enclosure at said air entrance opening for varying the area of the air entrance opening of said enclosure, power operated means operatively connected with said area varying means for adjusting the same, and means responsive to difference in velocity of the airflow along the exterior of said enclosure and the airflow through said air entrance opening operatively connected with said power operated means for varying the area of said air entrance opening in response to a difference in said velocities.

3. In a vehicle having an engine provided with heat dissipating means, a streamlined enclosure surrounding said heat dissipating means, an annular cooling air entrance opening in said enclosure, a series of adjustable flaps at said air entrance opening for varying the area of said entrance opening, a cooling air exit opening in said enclosure, a series of adjustable flaps at said air exit opening for varying the area of said exit opening, means responsive to the difference in the velocity of airflow along the outside of said enclosure and the velocity of airflow through said air entrance opening and operatively connected with said air entrance opening flap for adjusting said flaps to maintain the velocity of airflow through said air entrance opening substantially the same as the velocity of airflow along the outside of said enclosure, and means responsive to an operating condition of said engine and operatively connected with said air exit opening flap for regulating said flaps to proportion the quantity of air flowing through said enclosure to the cooling requirements of said engine.

4. Cowling and cooling means for an aircraft engine comprising, a cowl portion surrounding said engine, a streamlined member having a diameter somewhat less than the diameter of said cowl portion disposed in front of said cowl portion and terminating short of the forward end of said cowl portion to provide an annular cooling air entrance opening, a series of flaps at said air entrance opening for varying the size of said opening, means responsive to the difference between air flow velocities past said cowl and through said opening, and means actuated by said velocity difference responsive means operatively connected with said flaps for adjusting said flaps to maintain said velocities substantially equal, and a streamlined member at the rear end of said cowl portion spaced therefrom to provide an annular air exit opening.

5. In combination, an enclosure surrounding heat radiating surfaces, and having an air entrance opening and an air exit, means responsive to an operating condition, such as the temperature, of the heat radiating surfaces operative to regulate the quantity of air passing through said enclosure and through said air entrance opening, adjustable means varying the area of said air entrance opening and thus varying the velocity of the air flowing through said opening and means responsive to a difference in the velocity of air flowing along the outside of said enclosure adjacent said air entrance opening and the air flowing through said air entrance opening for automatically actuating said adjustable means to maintain a predetermined ratio between said two velocities.

6. In combination with an aircraft engine driving a propeller, a streamlined enclosure for said engine, an annular cooling air entrance slot in said enclosure between said engine and the front end of said enclosure, a series of adjustable flaps for controlling said air entrance opening, an annular cooling air exit opening in said enclosure to the rear of said engine, a set of adjustable flaps for controlling said air exit opening, mechanism responsive to the velocity of air flow along the outside of said enclosure and through said air entrance opening operatively associated with said entrance opening flaps to adjust said flaps in accordance with differences in said velocities, and mechanism operatively associated with said exit opening flaps and responsive to an operating condition of said engine to adjust said flaps to proportion the quantity of air flowing through said enclosure to the cooling requirements of said engine.

7. In combination with an aircraft engine, a heat radiator therefor, a streamlined enclosure surrounding said radiator and having an air entrance opening and an air exit opening for passing cooling air through said enclosure, adjustable means for varying the area of one of said openings, means independent of said adjustable means for controlling the quantity of cooling air passing through said enclosure in accordance with the cooling requirements of said heat radiator, and means for maintaining the drag of said enclosure at a minimum comprising a device responsive to the difference in velocity of the air flowing along the outside of said enclosure near said one opening and the air flowing through said one opening and operatively associated with said adjustable means to vary the area of said one opening and maintain said velocity difference below a predetermined value.

8. In combination with an aircraft engine, a heat radiator therefor, a streamlined enclosure surrounding said radiator and having an air entrance opening and an air exit opening for passing cooling air through said enclosure, adjustable means for varying the area of one of said openings, means independent of said adjustable means and including an air pump for proportioning the quantity of cooling air passing through said enclosure to the cooling requirements of said heat radiator, and means for maintaining the drag of said enclosure at a minimum comprising a device responsive to the difference in velocity of the air flowing along the outside of said enclosure near said one opening and the air flowing through said one opening and operatively associated with said adjustable means to vary the area of said one opening and maintain the velocity of the air flowing through said opening approximately the same as the velocity of the air flowing along the outside of said enclosure near said opening.

9. In combination with an aircraft engine, a heat radiator therefor, a streamlined enclosure surrounding said radiator and having an air entrance opening and an air exit opening for passing cooling air through said enclosure, adjustable means for controlling the quantity of cooling air passing through said enclosure in accordance with the cooling requirements of said heat radiator, means independent of said adjustable means for controlling the velocity of the air flowing through one of said openings, and a device responsive to the difference in velocity of the air flowing along the outside of said enclosure near said one opening and the air flowing through said one opening and operatively associated with said velocity controlling means to maintain said velocity difference at a predetermined value at which the drag of said enclosure is a minimum.

10. In combination with an aircraft engine, a streamlined enclosure surrounding said engine, an opening in said enclosure for transferring air between the airstream passing over said enclosure and the interior of said enclosure, means associated with said engine for regulating the quantity of air passing through said opening, means independent of said quantity regulating means for controlling the velocity of the air passing through said opening, and a device responsive to the difference in velocity of the air flowing along the outside of said enclosure near said opening and the air flowing through said opening and operatively associated with said velocity controlling means to maintain said velocity difference at a predetermined value at which the drag of said enclosure is a minimum.

DONALD S. HERSEY.